United States Patent
Uchida

(10) Patent No.: US 9,197,773 B2
(45) Date of Patent: Nov. 24, 2015

(54) IMAGE FORMING APPARATUS, IMAGE FORMING SYSTEM AND METHOD FOR CONTROLLING IMAGE FORMING OPERATION

(71) Applicant: KONICA MINOLTA, INC., Chiyoda-ku, Tokyo (JP)

(72) Inventor: Yuji Uchida, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/538,576

(22) Filed: Nov. 11, 2014

(65) Prior Publication Data

US 2015/0131123 A1    May 14, 2015

(30) Foreign Application Priority Data

Nov. 14, 2013    (JP) .................................. 2013-235879

(51) Int. Cl.
*H04N 1/00* (2006.01)
*G03G 15/00* (2006.01)

(52) U.S. Cl.
CPC ......... *H04N 1/00514* (2013.01); *G03G 15/502* (2013.01); *H04N 1/00464* (2013.01); *H04N 1/00477* (2013.01); *H04N 2201/0089* (2013.01); *H04N 2201/0094* (2013.01)

(58) Field of Classification Search
USPC ........................... 358/1.15; 715/234, 745, 763
See application file for complete search history.

(56) References Cited

U.S. PATENT DOCUMENTS

| 8,397,277 B2* | 3/2013 | Tsujimoto | 726/3 |
| 8,619,285 B2* | 12/2013 | Lee | 358/1.15 |
| 2009/0128844 A1 | 5/2009 | Kondo et al. | |
| 2010/0251132 A1* | 9/2010 | Nishino | 715/743 |

FOREIGN PATENT DOCUMENTS

| JP | 2009123009 A | 6/2009 |
| JP | 2012168819 A | 9/2012 |

* cited by examiner

*Primary Examiner* — Allen H Nguyen
(74) *Attorney, Agent, or Firm* — Holtz, Holtz, Goodman & Chick PC

(57) ABSTRACT

Disclosed is an image forming apparatus, which makes it possible to easily control various kinds of functions. The apparatus is provided with an apparatus controlling firmware that controls a default display screen, and a Web display screen application program that controls a customizable display screen according to a process being separate from another process for the apparatus controlling firmware. The Web display screen application program has a function for calling one of default display screens as a designated default display screen, while the apparatus controlling firmware has a function for accepting a screen calling instruction. When the Web display screen application program instructs the apparatus controlling firmware to conduct the screen calling operation in a state that the Web display screen application program displays the customizable display screen onto the display section, the apparatus controlling firmware conducts controlling operations for displaying the designated default display screen onto the display section.

18 Claims, 9 Drawing Sheets

| FUNCTIONS | SCREEN NUMBERS | RESOURCE NECESSITY STATUSES |
|---|---|---|
| ADJUST_A | 1 | MODE_1 |
| ADJUST_B | 2 | MODE_1 |
| ADJUST_C | 3 | MODE_2 |
| ADJUST_D | 4 | EXCEPT MODE_1 AND MODE_2 |
| ADJUST_E | 5 | COMPLETED ADJUST_D |

IMAGE FORMING APPARATUS, IMAGE FORMING SYSTEM AND METHOD FOR CONTROLLING IMAGE FORMING OPERATION

This application is based on Japanese Patent Application NO. 2013-235879 filed on Nov. 14, 2013, with the Japan Patent Office, the entire content of which is hereby incorporated by reference.

BACKGROUND OF THE INVENTION

1. Field of the Invention

The present invention relates to an image forming apparatus, an image forming system and a method for controlling image forming operations, and specifically relates to a technology that makes it possible to conduct control operations for efficiently calling a display screen, which is to be controlled under firmware installed in an apparatus side, and a customizable display screen, which is to be customized by process controlling operations, in an appropriate and efficient manner.

2. Description of Related Art

Generally speaking, various kinds of operations to be conducted in an image forming apparatus are conducted by a control section including a CPU (Central Processing Unit), etc. Further, the control section, above-mentioned, controls the various kinds of operations to be performed by each of sections constituting the image forming apparatus according to control programs based on an OS (Operating System) and/or firmware currently installed in the image forming apparatus concerned. Still further, the control section executes various kinds of arithmetic calculations based on the OS (Operating System) and/or the firmware, currently installed in the image forming apparatus concerned, in order to conducts overall controlling operations of the image forming apparatus.

In this connection, various kinds of display screens to be displayed on an operating display section of the image forming apparatus, such as an operating panel, etc., are managed by an apparatus controlling firmware. On the other hand, it is possible to make a Web-browser operate on the OS (Operating System) as another process being different from a process of the apparatus controlling firmware, so as to depict and display contents described in a markup language, such as an HTML, etc. Accordingly, since it is possible for the user or the like to arbitrarily customize such the display screen to be displayed under the Web-browser at his discretion, such the display screen as above-mentioned can be called a "customizable display screen".

In this connection, hereinafter, the display screen to be managed and provided by the apparatus controlling firmware is called a "default display screen", in order to discriminate the "default display screen" and the "customizable display screen" from each other. In other words, in the image forming apparatus concerned, it is possible to make the display section thereof display not only the existing "default display screen" created in advance under the apparatus controlling firmware, but also the "customizable display screen" above-mentioned.

The "customizable display screen" as above-mentioned may include: a display screen, main object of which is to display characters and images thereon, such as a help screen; another display screen that issues a predetermined command signal in conjunction with an operation for depressing a button or icon residing within the operating section; still another display screen that displays the status information acquired from the apparatus concerned; etc.

In this connection, with respect to a simple operation for issuing a command signal, for displaying a detected status information, etc., it may be easy to create a customizable display screen. However, it may be hardly possible to create such a display screen that is virtually same as a copied screen created under the apparatus controlling firmware, as the customizable display screen.

For instance, it is hardly possible to create a consecutive overall processing as the customizable display screen, wherein the consecutive overall processing may include steps of: under the apparatus controlling firmware, acquiring information in regard to a number of paper sheet feeding trays provided in the apparatus concerned, a paper sheet size, a residual amount of paper sheets, etc.; instructing the apparatus controlling firmware to establish print settings (such as one side or duplex printing, a designated paper sheet, a processing of designated paper sheet, etc.) corresponding to the designations inputted by the user; coping with an abnormality at the time when an abnormality, such as a jam, etc., occurs in midcourse of the printing operation; so on.

Further, the default display screen is managed under the apparatus controlling firmware. Whereas, the customizable display screen is managed under Web-browser, etc., the process of which is separate from that of the apparatus controlling firmware. Accordingly, the managing method of the default display screen is completely different from that of the customizable display screen.

In this connection, Japanese Patent Application Laid-Open Publication No. 2012-168819 sets forth such the challenge that try to make it possible to display the customizable display screen, other than a normal screen to be managed under the apparatus controlling firmware.

As well as the above, Japanese Patent Application Laid-Open Publication No. 2009-123009 also sets forth the other challenge that try to make it possible to display the customizable display screen, other than a normal screen to be managed under the apparatus controlling firmware.

According to Japanese Patent Application Laid-Open Publication No. 2012-168819, above-cited, it is possible to establish a my panel screen serving as an operating screen, a layout of which is inherent to every user. In addition, in the image processing apparatus in which a Web service application program is registered, when the user intend to use the Web service application program, the screen structure inherent to the application program is made to approximate to the layout of the my panel screen. As a result of the above, the image processing apparatus conducts controlling operations, so as to yield a sense of unification between the my panel screen at the time of using the functions of the image processing apparatus concerned and the operating screen currently displayed under the application program.

Further, according to Japanese Patent Application Laid-Open Publication No. 2009-123009, above-cited, discloses such the system that makes it possible to create a user interface, which is the favorite of one of users, in a plurality of image forming apparatuses. For this purpose, in a case where the operation for customizing the display screen is applied to both an old-type image forming apparatus and a new-type image forming apparatus, and a certain designation, which is inapplicable for the user's own apparatus, is included in the display screen customizing information, the system is so constituted that the concerned designation is made to be deleted from the display screen customizing information. According to this feature, the custom display screen can be created by automatically extracting only a usable designation therefrom.

As described in the foregoing, each of the systems, respectively set forth in Japanese Patent Application Laid-Open Publications No. 2012-168819 and No. 2009-123009, makes it possible to give a sense of unification between the display screens to the user. However, no proposal has been issued so far, in regard to a controlling operation for making the default display screen, which is to be managed by the apparatus controlling firmware, operate in conjunction with the customizable display screen to be managed through the separate process.

In this connection, in the customizable display screen described in the Markup language, such as an HTML (Hyper Text Markup Language), etc., it is possible to make the concerned display screen jump to another image or display screen through the Hyper Link. However, arisen is a problem that the default display screen to be managed by the apparatus controlling firmware does not correspond to the address of the Hyper Link. In other words, it has been uneasy to control various kinds of functions, provided in the image forming apparatus managed under the apparatus controlling firmware, from the customizable display screen.

SUMMARY OF THE INVENTION

To overcome the abovementioned drawbacks in conventional image forming apparatuses, it is one of objects of the present invention to provide an image forming apparatus, an image forming system and a method for controlling image forming operation, each of which makes it possible to easily control various kinds of functions provided in an image forming apparatus, in a case where both of the default display screen and the customizable display screen can be displayed onto a display section.

Accordingly, at least one of the objects of the present invention can be attained by any one of the image forming apparatuses described as follows.

(1) According to an image forming apparatus reflecting an aspect of the present invention, the image forming apparatus comprises: a storage section; and a control section that employs a hardware resource to conduct a controlling operation in regard to an image forming operation; wherein the control section is capable of executing an apparatus controlling firmware that controls a default display screen, which is provided for a status display and an instruction accepting use display in regard to the image forming operation, both to be displayed on a display section, according to a first process, and a Web display screen application program that controls a customizable display screen, which can be arbitrarily customized and is provided for the status display and the instruction accepting use display, both to be displayed on the display section, according to a second process being separate from the first process for the apparatus controlling firmware; and wherein, based on the Web display screen application program, the control section designates any one of default display screens to be controlled by the apparatus controlling firmware, so as to conduct a screen calling operation for calling out the any one of the default display screens as a designated default display screen; and wherein, when the Web display screen application program instructs the apparatus controlling firmware to conduct the screen calling operation in a state that the Web display screen application program displays the customizable display screen onto the display section, the control section outputs the designated default display screen onto the display section, based on the apparatus controlling firmware.

(2) According to another aspect of the present invention, in the image forming apparatus recited in item 1, it is desirable that the Web display screen application program is provided with a Web-browser that displays a description written in a Markup language as the customizable display screen.

(3) According to still another aspect of the present invention, in the image forming apparatus recited in item 1 or 2, it is desirable that, based on a screen number to be employed for managing the default display screen by the apparatus controlling firmware, the control section conducts the screen calling operation.

(4) According to still another aspect of the present invention, in the image forming apparatus recited in any one of items 1-3, it is desirable that the storage section stores in advance information in regard to a resource necessity status, which serves as a necessary status of the hardware resource to be required for displaying the default display screen, for every display screen, therein; and based on the apparatus controlling firmware, the control section compares the resource necessity status with a resource real status, which serves as a real status of the hardware resource currently existing in the image forming apparatus; and when determining that the resource necessity status and the resource real status do not coincide with each other, the control section does not output the default display screen onto the display section, while, when determining that the resource necessity status and the resource real status coincide with each other, the control section outputs the default display screen onto the display section.

(5) According to still another aspect of the present invention, in the image forming apparatus recited in any one of items 1-4, it is desirable that, when finalizing an operation for outputting the designated default display screen, which has been designated by the screen calling operation from the Web display screen application program, the control section notifies the Web display screen application program of a notification indicating that the operation for outputting the designated default display screen has been finalized; and based on the Web display screen application program, the control section has stored the customizable display screen, which was displayed at the time when the screen calling operation was implemented, therein, and when receiving the notification, the control section outputs the customizable display screen onto the display section.

(6) According to yet another aspect of the present invention, in the image forming apparatus recited in any one of items 1-5, it is desirable that a controlling operation for controlling any one of sectional sites, residing within the image forming apparatus, is conducted through the default display screen based on the apparatus controlling firmware, while, another controlling operation for controlling any one of the sectional sites, residing within the image forming apparatus, is conducted through the customizable display screen.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
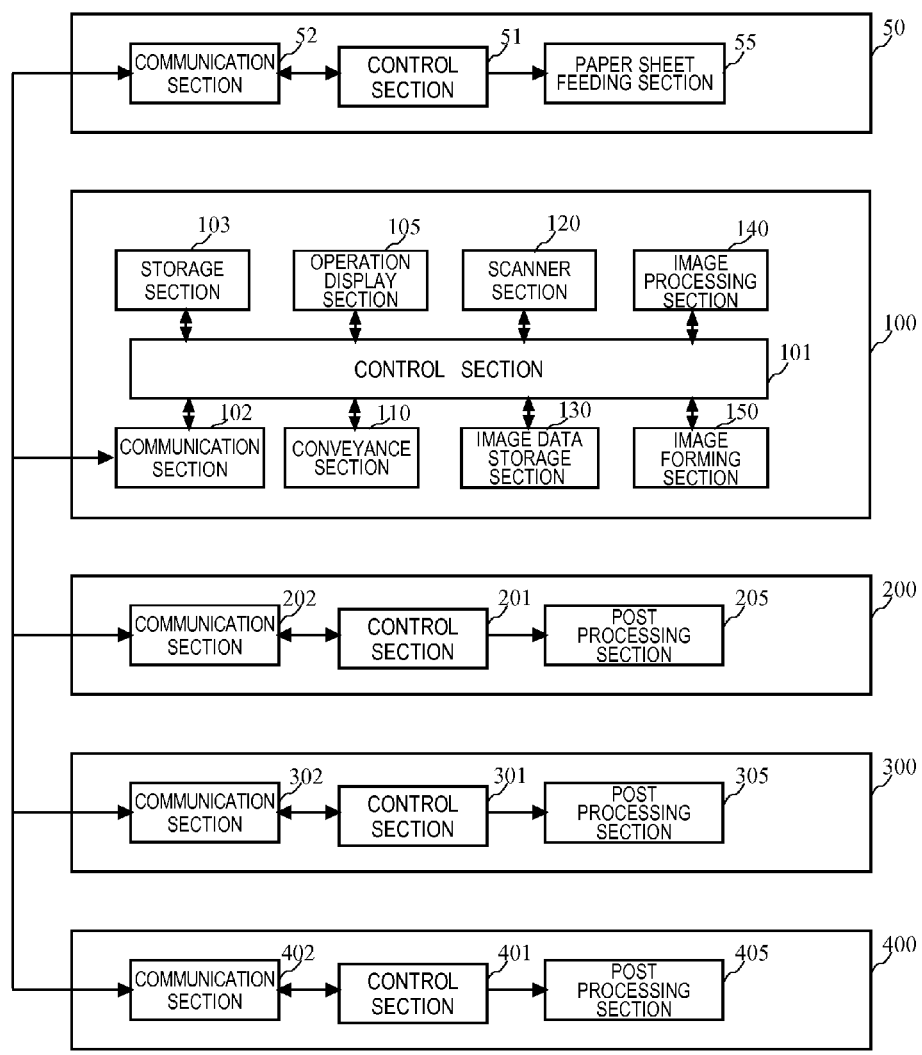
FIG. 1 is a block diagram showing a configuration of an image forming system including an image forming apparatus in accordance with an embodiment of the present invention.

Referring to the drawings, the preferred embodiment in accordance with the present invention will be detailed in the following.

<Configuration of Image Forming Apparatus>

Figure 2:
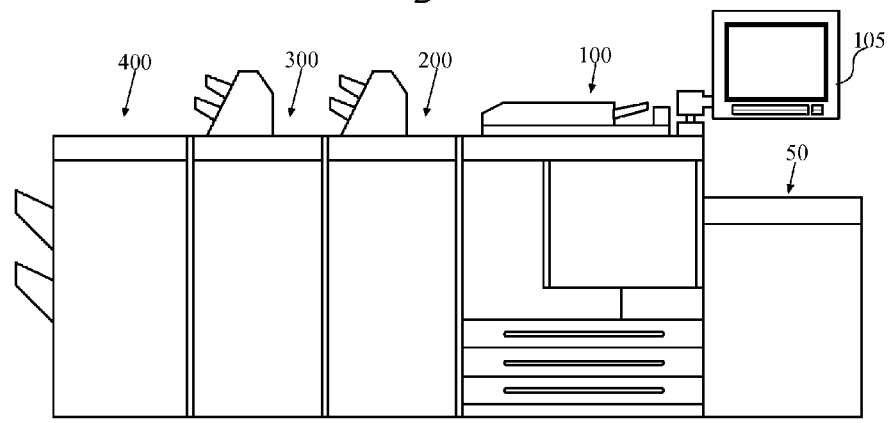
FIG. 2 is a schematic diagram showing an outer appearance of an image forming system including an image forming apparatus in accordance with an embodiment of the present invention.
Figure 3:
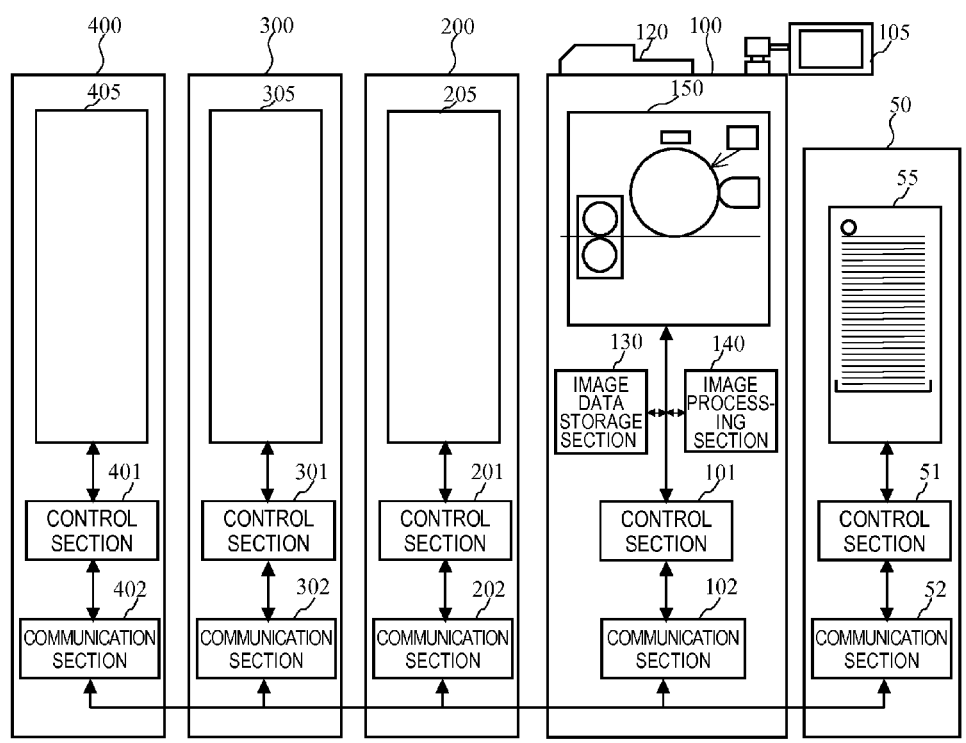
FIG. 3 is a schematic diagram indicating a structural arrangement of an image forming apparatus and other apparatuses, which are included in an image forming system in accordance with an embodiment of the present invention.

FIG. 1 is a block diagram showing a configuration of various kinds of sections included in an image forming system in accordance with an embodiment of the present invention, while FIG. 2 is a schematic diagram showing an outer appearance of the image forming system including an image forming apparatus 100 in accordance with an embodiment of the present invention and FIG. 3 is another schematic diagram indicating a structural arrangement of the image forming apparatus 100 and other apparatuses included in the image forming system.

As shown in FIGS. 1-3, a paper sheet feeding apparatus 50, the image forming apparatus 100, a first post processing apparatus 200, a second post processing apparatus 300 and a third post processing apparatus 400 are serially cascaded in this order, so as to constitute an image forming system.

In other words, the image forming apparatus 100 forms an image onto a paper sheet fed from the paper sheet feeding apparatus 50, and then, the first-third post processing apparatuses 200-400 sequentially apply various kinds of post processing to the paper sheet on which the image is already formed, along the flow of the post processing to be conducted in the serially cascaded configuration above-mentioned.

In this connection, hereinafter, along the flow of the paper sheet, the upstream side is called a previous stage, while the downstream side is called a later stage. Further hereinafter, although the configuration in which the three post processing apparatuses are serially cascaded is exemplified as a concrete embodiment in accordance with the present invention, any number of post processing apparatuses may be applicable as another embodiment in accordance with the present invention.

The paper sheet feeding apparatus 50 is constituted by a control section 51, a communication section 52, a paper sheet feeding section 55. The control section 51 controls each of the sections provided in the paper sheet feeding apparatus 50. The communication section 52 communicates with the other apparatuses coupled to the paper sheet feeding apparatus 50. The paper sheet feeding section 55 sequentially feeds paper sheets, stacked therein, one by one at designated timings.

The image forming apparatus 100 is constituted by a control section 101, a communication section 102, a storage section 103, an operation display section 105, a conveyance section 110, a scanner section 120, an image data storage section 130, an image processing section 150 and an image forming section 160.

In the structural configuration above-mentioned, the control section 101 controls each of the sections provided in the image forming apparatus 100, and at the same time, controls overall operations of the system serving as the image forming system. The communication section 102 implements operations for communicating with the other apparatuses coupled thereto. The storage section 103 stores various kinds of data. The operation display section 105 is constituted by an LCD (Liquid Crystal Display) section, a touch panel, etc., in order to accept inputting operations performed by the user, and to display the various kinds of images and messages for the user thereon. The conveyance section 110 conveys the paper sheet in accordance with a process timing of the image forming operation. The scanner section 120 reads document images so as to generate image data thereof. The image data storage section 130 stores the image data and various kinds of data, which are to be employed for the image forming operation, into a nonvolatile storage device. The image processing section 150 applies various kinds of image processing necessary for the image forming operations, such as a compression or expansion processing, a RIP (Raster Image Processing), etc., to the image data. The image forming section 160 implements the image forming operation (printing operation) based on an image forming command and the image data.

The first post processing apparatus 200 is constituted by a control section 201, a communication section 202 and a post processing section 205. In this connection, in a case that the post processing section 205 is directly operated by the image forming apparatus 100 or under the controlling operations from the image forming apparatus 100, the control section 201 can be omitted.

In the configuration above-mentioned, the control section 201 controls each of the sections provided in the first post processing apparatus 200. The communication section 202 communicates with the other apparatuses coupled to the first post processing apparatus 200. Under the controlling operations conducted by the control section 201, the post processing section 205 applies various kinds of post processing (such as a punch processing, a staple processing, a bind processing, etc.) onto the paper sheet on which the image is already formed by the image forming apparatus 100.

The second post processing apparatus 300 is constituted by a control section 301, a communication section 302 and a post processing section 305. In this connection, in a case that the post processing section 305 is directly operated by the image forming apparatus 100 or under the controlling operations from the image forming apparatus 100, the control section 301 can be omitted.

In the configuration above-mentioned, the control section 301 controls each of the sections provided in the second post processing apparatus 300. The communication section 302 communicates with the other apparatuses coupled to the second post processing apparatus 300. Under the controlling operations conducted by the control section 301, the post processing section 305 applies various kinds of post processing (such as a punch processing, a staple processing, a bind processing, etc.) onto the paper sheet on which the image is already formed by the image forming apparatus 100.

The third post processing apparatus 400 is constituted by a control section 401, a communication section 402 and a post processing section 405. In this connection, in a case that the post processing section 405 is directly operated by the image forming apparatus 100 or under the controlling operations from the image forming apparatus 100, the control section 401 can be omitted.

In the configuration above-mentioned, the control section 401 controls each of the sections provided in the third post processing apparatus 400. The communication section 402 communicates with the other apparatuses coupled to the third post processing apparatus 400. Under the controlling operations conducted by the control section 401, the post processing section 405 applies various kinds of post processing (such as a punch processing, a staple processing, a bind processing, etc.) onto the paper sheet on which the image is already formed by the image forming apparatus 100.

Now, referring to the schematic diagram shown in FIG. 4, the configuration and the functions, internally provided in the control section 101 of the image forming apparatus 100, will be schematically detailed in the following. In this connection, the constituents being same as those shown in FIGS. 1-3 are attached with the same reference numbers of those shown in FIGS. 1-3, and duplicated explanations for them will be omitted.

Figure 4:
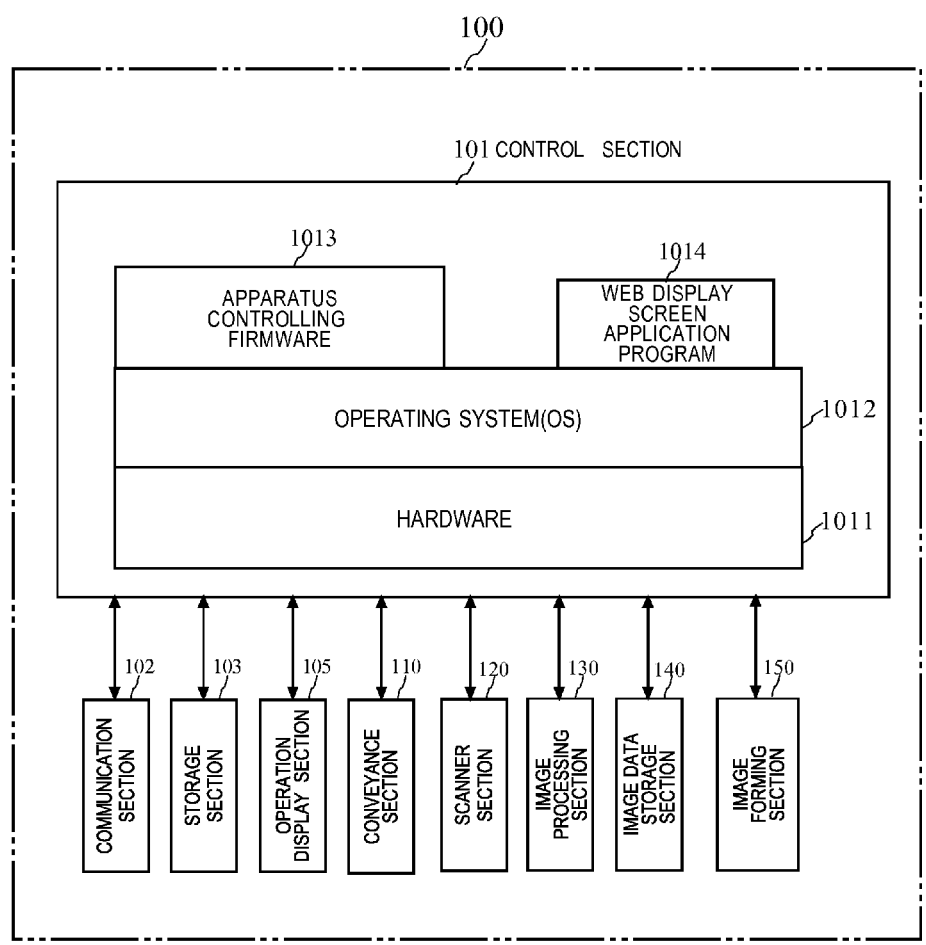
FIG. 4 is a block diagram indicating a structural configuration of a main section of an image forming apparatus in accordance with an embodiment of the present invention.

In the image forming apparatus 100 shown in FIG. 4, the control section 101 is constituted by a CPU (Central Processing Unit), etc., in order to control each of the sections provided in the image forming apparatus 100, and to control operations to be performed by executing application programs, based on the apparatus controlling firmware provided on the OS (Operating System).

Hereinafter, in the following descriptions, the Operating System is referred to as the "OS" for simplicity. In this connection, hereinafter, the term of "OS" is defined as a kind of system software that provides an interface, which is created by abstracting a hardware (serving as an abstraction hardware), to an application program, aiming at improving the usage efficiency of the computer based on hardware abstractions, resource managements, devisal measures of resource allotment. Further, the term of "firmware" is defined as such specific software that is installed beforehand into an electric apparatus in a state that the concerned software is written into an LSI (Large Scale Integrated Circuit) such as a ROM (Read Only Memory), etc., in order to control a computer system (hardware) incorporated into the electric apparatus concerned.

The control section 101 is constituted by hardware 1011, an OS 1012, an apparatus controlling firmware 1013 and a Web display screen application program 1014, as its fundamental configuration. In the above-mentioned configuration, the OS 1012 is operated on the hardware 1011 so as to serve as a fundamental base of various kinds of operations to be conducted therein. The apparatus controlling firmware 1013 employs various kinds of hardware resources (including the hardware 1011, the communication section 102, the operation display section 105, the image data storage section 130, the image processing section 150, the image forming section 160, etc.) to conduct various kinds of processing in regard to the image forming operations. The Web display screen application program 1014 controls operations for displaying a customizable display screen, detailed later.

Herein, in addition to conducting various kinds of controlling operations in regard to the image forming operations by employing various kinds of hardware resources, the apparatus controlling firmware 1013 conducts controlling operations for displaying a "default display screen", which is provided for displaying a current status of the operation display section 105 in regard to the image forming operation, and for displaying a screen of designation accepting use.

Further, the Web display screen application program 1014 is a kind of application program, which is to be operated on the OS 1012 and capable of controlling the display screen. Still further, according to a controlling process being separate from that to be conducted by the apparatus controlling firmware 1013, the Web display screen application program 1014 controls the "customizable display screen", which is arbitrarily customizable for the user and employed for displaying the statuses and the screen of designation accepting use on the operation display section 105. The "customizable display screen" is depicted on the basis of the descriptions written in the Markup language, and is displayed through a Web-browser as such a display screen that can be arbitrarily customized by the user.

Concretely speaking, the customizable display screen is created by writing descriptions in the Markup language, such as the HTML (Hyper Text Markup Language), the XML, the SGML, the XHTML, etc., and displayed on the operation display section 105 through the Web-browser by the Web display screen application program 1014. In this connection, the Web display screen application program 1014 can communicate with the apparatus controlling firmware 1013 by using a predetermined script language, etc., in conjunction with the Web-browser.

<Preconditions in Image Forming Apparatus, Image Forming System and Method for Controlling Image Forming Operation>

Next, as a concrete example of the customizable display screen to be controlled by the Web display screen application program 1014, such a case that a fault recovery procedure is displayed at the time when fault recovery operations are to be performed in the image forming apparatus 100, will be detailed in the following.

For instance, in case of an image quality fault, as the fault recovery procedure to be conducted in the image forming apparatus 100, it is necessary to cope with the image quality fault by employing many kinds of adjusting functions, including a gamma adjustment, a color registration adjustment, a toner density adjustment, etc.

Conventionally, the above-mentioned fault recovery procedure has been publicly released to the service engineers in charge of repairing the image forming apparatus 100. However, since adjustment screens, which are necessary for the repairing activities to be performed according to the fault recovery procedure, cover a versatile range of various screens, it has been very cumbersome for the service engineer to confirm the operating procedure in each of the adjusting screen according to the service manual concerned.

To overcome the above-mentioned drawback, it may be considered such a measure that a batch image, in which various kinds of screens, necessary for implementing the functions required for performing the fault recovery procedure, are integrally displayed, is created as the default display screen to be managed by the apparatus controlling firmware 1013, so as to improve the operability thereof.

However, according to the measure as above-mentioned, when the contents of the fault recovery procedure are updated, it is also necessary to update the default display screen. Owing to the above-mentioned drawback, arisen is another problem that it becomes necessary to update the apparatus controlling firmware 1013 as well.

Accordingly, in order to cope with the updated contents of the fault recovery procedure without updating the apparatus controlling firmware 1013, it may be considered such another measure that the various screens, included in the fault recovery procedure, are made to integrate into a single screen by employing the customizable display screen managed under the Web display screen application program 1014.

However, the customizable display screen to be displayed through the Web-browser is written in the Markup language, such as the HTML, etc., while the default display screen is directly managed by the apparatus controlling firmware 1013. Accordingly, the management method of the customizable display screen is completely different from that of the default display screen. Therefore, it is impossible for the apparatus controlling firmware 1013 to call the default display screen directly from the customizable display screen.

Owing to the drawback as above-mentioned, it has been necessary for the customizable display screen side to create all of the screens necessary for implementing the adjustments required for performing the fault recovery procedure. Accordingly, a large number of man-hours has been required for improving the operating procedure.

<Operations of Image Forming Apparatus and Image Forming System, and Procedure of Method for Controlling Image Forming Operation>

Referring to the flowchart shown in FIG. 5 and various kinds of explanatory schematic diagrams of the display screen, etc., the operations of the image forming apparatus 100 and the image forming system, and the procedure of method for controlling the image forming operation will be detailed in the following. As a concrete example of the customizable display screen, such a case that a fault recovery procedure is displayed at the time when the fault recovery operations are to be performed in the image forming apparatus 100 will be detailed in the following.

Figure 5:
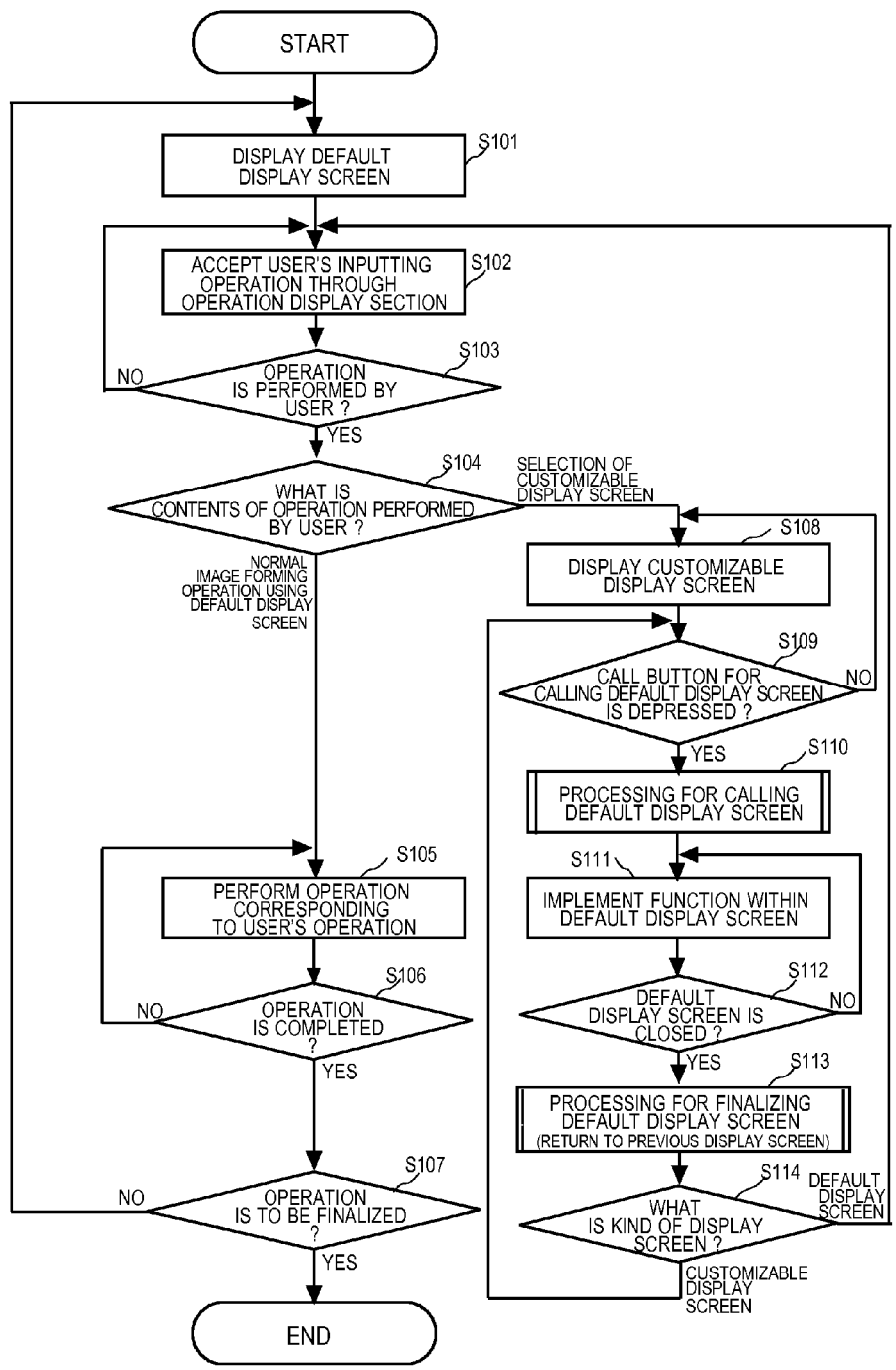
FIG. 5 is a flowchart indicating a flow of operations to be implemented in an image forming apparatus in accordance with an embodiment of the present invention.

In accordance with the commencement of the operation performed by the image forming apparatus 100, the control section 101 displays the default display screen, managed by the apparatus controlling firmware 1013, onto the operation display section 105 (Step S101, shown in FIG. 5). In this connection, the default display screen above-mentioned is one of various kinds of default display screens, which are created in advance so as to make the contents of each of them match with each of the current statuses of the image forming apparatus 100, and which are managed by the apparatus controlling firmware 1013.

Successively, the control section 101 accepts an operation performed by the user through the operation display section 105 (Step S102 and Step S103, both shown in FIG. 5). When determining that the operation performed by the user is an operating instruction in regard to the normal image forming operation using the default display screen (Step S104; "NORMAL INSTRUCTION WITHIN DEFAULT DISPLAY SCREEN", shown in FIG. 5), the control section 101 makes each of the sections and/or the first-third post processing apparatuses 200-400 perform the operation corresponding to the user's instructing operation (Step S105, Step S106 and Step S107, those shown in FIG. 5). In this connection, since the operation to be performed in the image forming apparatus 100 and/or the first-third post processing apparatuses 200-400 belongs to the well-known normal image forming operation, hereinafter, the detailed explanations for it will be omitted.

Further in this connection, it is assumed, hereinafter, that the Web display screen application program 1014 is provided with the customizable display screen in regard to the fault recovery procedure serving as a service assistant tool. In other words, customizable display screen information, written in the HTML or the like for displaying the fault recovery procedure as the customizable display screen, is stored in the storage section 103 through the network or the USB (Universal Serial Bus) storage device, etc., by the user, the manager, the service person, etc. Alternatively, instead of storing the information into the storage section 103, it is also applicable that the customizable display screen information is stored in advance into an external storage device or a USB storage device, so as to input the concerned information through the network or the USB storage device as needed. By inputting the customizable display screen information through the network or the USB storage device as above-mentioned, arisen is such an advantageous feature that it becomes unnecessary to update the apparatus controlling firmware 1013 at the time of depicting a necessary display screen.

Figure 6:
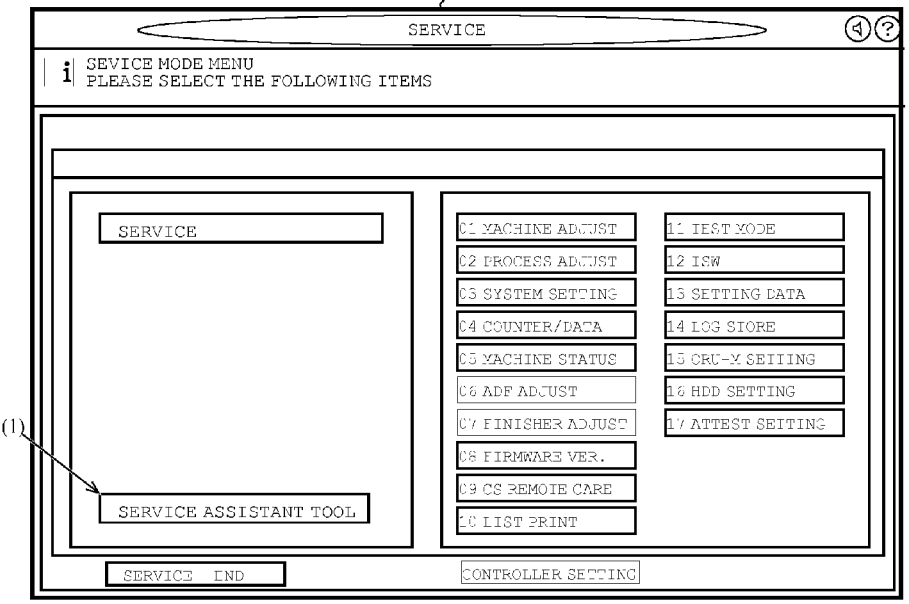
FIG. 6 is an explanatory schematic diagram showing a display screen to be displayed during an operation of an image forming apparatus in accordance with an embodiment of the present invention.

Still further, assuming that the customizable display screen is controlled by the Web display screen application program 1014, a button (indicated by (1) shown in FIG. 6), serving as a screen calling button for calling the customizable display screen, is provided in the default display screen to be managed by the apparatus controlling firmware 1013.

In this connection, it is assumed that, in order to perform various kinds of setting and adjusting operations, the user instructs the operation display section 105 to display a service mode menu screen 105Ga1 (shown in FIG. 6) within the area of the default display screen. In addition, it is further assumed that, in order to make the operation display section 105 display the fault recovery procedure thereon, the user selects (depresses) the button labeled "SERVICE ASSISTANT TOOL" (indicated by (1) shown in FIG. 6), (Step S104; SELECTION OF CUSTOMIZABLE DISPLAY SCREEN, shown in FIG. 5).

Receiving the above-mentioned operations performed by the user, the control section 101 executes the Web display screen application program 1014 to read out necessary information in regard to the customizable display screen from the storage section 103, and then, makes the operation display section 105 display a service assistant tool screen 105Ga2 (shown in FIG. 7) serving as the customizable display screen, thereon (Step S108, shown in FIG. 5).

In this connection, the service assistant tool screen 105Ga2 serves as the customizable display screen written in the Markup language, such as HMTL, etc., and created by the user. Further, the service assistant tool screen 105Ga2 is created for the purpose of notifying the service person or the like of the fault recovery procedure displayed thereon.

In addition, the service assistant tool screen 105Ga2, above-mentioned, also indicates a specific fault recovery procedure to be employed in such a case where a certain image defect, such as a white stream, a white band, a color stream, a color band, etc., is generated on an outputted product as a result of performing the image forming operation (paper sheet on which an image is already formed).

Then, the user selects the "GAMMA ADJUSTMENT" and the "TEST PATTERN OUTPUTTING MODE", both conducted by the apparatus controlling firmware 1013 of the image forming apparatus 100, from the service assistant tool screen 105Ga2, in order to utilize them as the fault recovery procedure for eliminating the image defect, such as a white stream, a white band, a color stream, a color band, etc.

Figure 7:
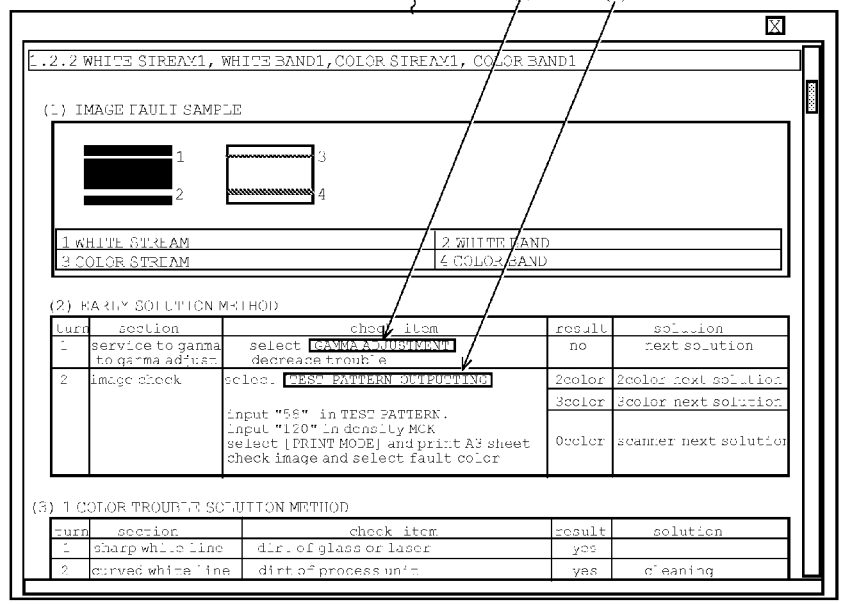
FIG. 7 is an explanatory schematic diagram showing another display screen to be displayed during an operation of an image forming apparatus in accordance with an embodiment of the present invention.

For the above-mentioned purpose, the service assistant tool screen 105Ga2 is provided with a call button (indicated by arrow (2), shown in FIG. 7) for calling the default display screen of the "GAMMA ADJUSTMENT" to be conducted by the apparatus controlling firmware 1013, and another call button (indicated by arrow (3), shown in FIG. 7) for calling the other default display screen of the "TEST PATTERN OUTPUTTING MODE" to be conducted by the apparatus controlling firmware 1013.

On the other hand, the Web display screen application program 1014 is provided with a function (screen calling function) for designating any one of the default display screens, which are currently managed by the apparatus controlling firmware 1013, to call out the above-designated default display screen therefrom. In this connection, based on screen numbers to be employed when the apparatus controlling firmware 1013 manages the default display screens, the Web display screen application program 1014 conducts the screen calling operation for calling out a specific one of the default display screens, which is performed on the customizable display screen.

In other words, although the customizable display screen is written in the Markup language, such as HMTL, etc., the screen numbers, which are to be employed when the apparatus controlling firmware 1013 manages the default display screens, are employed for the above-mentioned purpose, instead of the her link being general in the Markup language concerned.

Now, returning to the flowchart shown in FIG. 5, when the call button (indicated by arrow (2), shown in FIG. 7) for calling the default display screen of the "GAMMA ADJUSTMENT" is depressed (Step S109; YES, shown in FIG. 5), the service assistant tool screen 105Ga2, serving as the customizable display screen, sends the screen number of the default display screen in regard to the "GAMMA ADJUSTMENT" to the apparatus controlling firmware 1013, so as to perform the screen calling operation (Step S110, shown in FIG. 5).

As well as the above-mentioned, when the other call button (indicated by arrow (3), shown in FIG. 7) for calling the default display screen of the "TEST PATTERN OUTPUTTING MODE" is depressed (Step S109; YES, shown in FIG. 5), the service assistant tool screen 105Ga2, serving as the customizable display screen, sends the screen number of the default display screen in regard to the "TEST PATTERN OUTPUTTING MODE" to the apparatus controlling firmware 1013, so as to perform the screen calling operation (Step S110, shown in FIG. 5).

On the other hand, the apparatus controlling firmware 1013 is provided with a function for accepting the screen calling instruction sent from the Web display screen application program 1014. Concretely speaking, when the Web display screen application program 1014 sends the screen calling instruction to the apparatus controlling firmware 1013 in a state that the Web display screen application program 1014 currently outputs the customizable display screen onto the operation display section 105, the apparatus controlling firmware 1013 conducts controlling operations so as to output the default display screen designated by the screen calling instruction.

In this connection, based on the screen number of the default display screen, the screen calling operation is implemented by the instruction sent from the Web display screen application program 1014 to the apparatus controlling firmware 1013. Accordingly, even though either a screen content of the default display screen or a function corresponding to the default display screen has been updated due to a certain version upgrade of the apparatus controlling firmware 1013, the screen calling operation, being just same as that before the update concerned, is implemented, unless the screen number of the concerned default display screen has been changed. Therefore, it becomes possible to implement the screen calling operation without taking any conscious of new function currently introduced by the version upgrade.

Herein, referring to the flowchart shown in FIG. 8, the screen calling operation for calling out the default display screen (Step S110, shown in FIG. 5) will be detailed in the following. The apparatus controlling firmware 1013, installed in the image forming apparatus 100 conventionally existing in the market, is so constituted that the default display screen is called out by proceeding with necessary processing according to a predetermined order. For instance, by following a predetermined adjustment order and a predetermined order of displaying screens, established as such an order of a default display screen A (adjustment A), a default display screen B (adjustment B), a default display screen C (adjustment C), a default display screen D (adjustment D), so on, the display screen is updated while going through steps of changing the apparatus status and operating mode of the image forming apparatus 100 in a stepwise manner, and changing the steps of the apparatus status and the operating mode into appropriate states.

In contrast to the above, one of the features of the embodiment of the present invention is to directly call any one of the default display screens (any one of the adjustment items) from the customizable display screen. Concretely speaking, according to the present embodiment, it is not impossible case that the default display screen C is directly called out by skipping the operations for calling the default display screen A and the default display screen B. In other words, according to the present embodiment, it may be possible to conduct such the screen calling operation that omits the steps of going through the apparatus status and the operating mode, which have been the essential steps in the conventional system.

Figure 8:
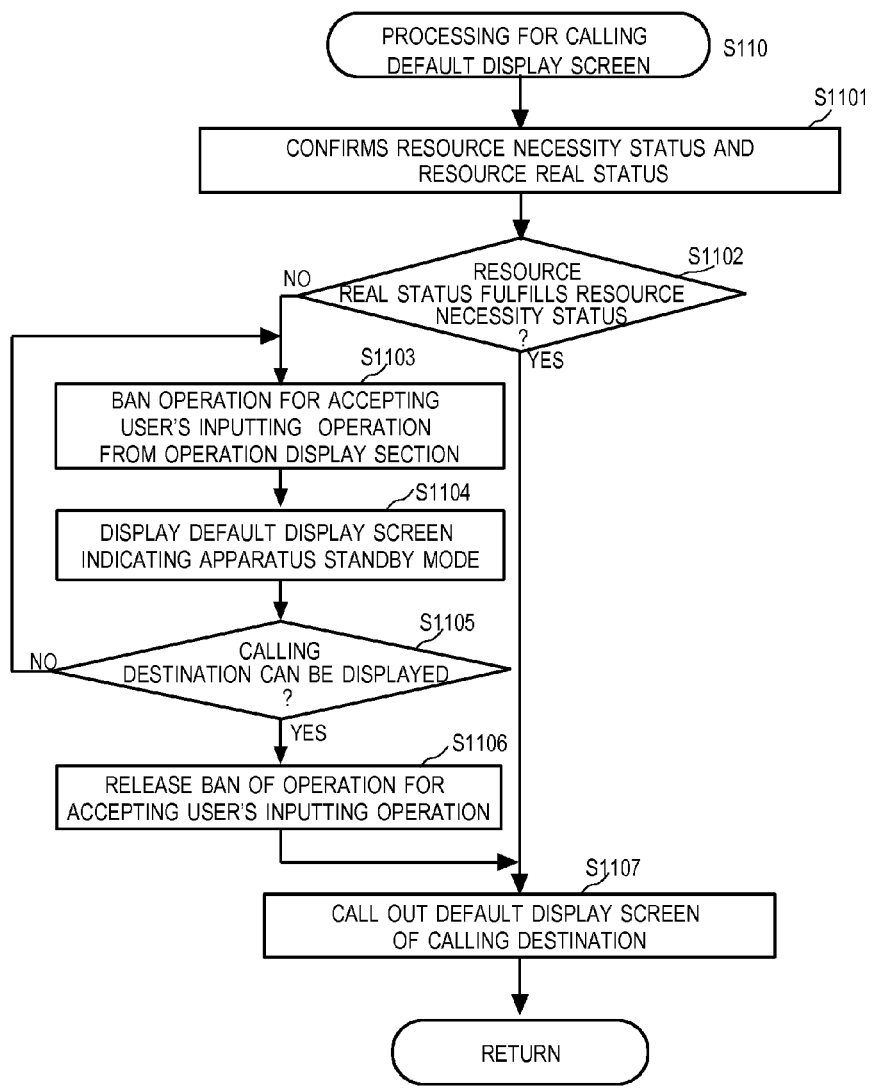
FIG. 8 is a flowchart indicating a flow of operations to be implemented in an image forming apparatus in accordance with an embodiment of the present invention.

Accordingly, on the occasion of implementing the processing for calling the default display screen (Step S110, shown in FIG. 5), the apparatus controlling firmware 1013 confirms a resource necessity status and a resource real status (Step S1101, shown in FIG. 8). Hereinafter, the term of "resource real status" is defined as a current real status of the hardware resource, at the time of displaying the default display screen. Further, hereinafter, the term of "resource necessity status" is defined as a status of the hardware resource required at the time of displaying the default display screen.

Figures 9, 10:
FIG. 9 is an explanatory schematic diagram indicating various kinds of operating statuses of an image forming apparatus in accordance with an embodiment of the present invention.
FIG. 10 is an explanatory schematic diagram showing still another display screen to be displayed during an operation of an image forming apparatus in accordance with an embodiment of the present invention.

In this connection, the table shown in FIG. 9 can be cited as an example of the "resource necessity status". The functions (adjusting items), the screen numbers of the default display screens and the resource necessity statuses may be stored in advance into the apparatus controlling firmware 1013 or the storage section 103, etc., in the table format as shown in FIG. 9, while correlating them with each other.

Herein, assuming that operating mode 1 is set at a normal mode, it is possible to call out the default display screens having screen number 1 and screen number 2 during the normal mode. However, in order to call out the other default display screen having screen number 3, it is necessary to change the operating mode from operating mode 1 to operating mode 2. As well as the above-mentioned, in order to call out still the other default display screen having screen number 4, it is necessary to change the operating mode to a number other than 1 or 2 (for instance, other than the currently operating status of the image forming section 160). Further, as well as the above-mentioned, in order to call out yet the other default display screen having screen number 5, it is necessary to make adjustment D, having screen number 4, finalize.

As a result of the confirming operation in Step S1101, when determining that the "resource real status" fulfills the "resource necessity status" (Step S1102; YES, shown in FIG. 8), the apparatus controlling firmware 1013 calls out the default display screen, designated by the calling out instruction, to display the concerned default display screen onto the operation display section 105, and implements the adjustment item of the function corresponding to the default display screen concerned (Step S1107, shown in FIG. 8).

As a result of the confirming operation in Step S1101, when determining that the "resource real status" does not fulfill the "resource necessity status" (Step S1102; YES, shown in FIG. 8), the apparatus controlling firmware 1013 bans the operation for accepting the user's inputting operation from the operation display section 105 (Step S1103, shown in FIG. 8), and at the same time, conducts controlling operations for displaying a default display screen 105Ga3 (shown in FIG. 10), which indicates such a state that the apparatus currently enters into a standby mode for changing the operating mode (Step S1104, shown in FIG. 8). In the default display screen 105Ga3 shown in FIG. 10, the message of "Now, in midcourse of changing the operating mode. Please wait for a while." is displayed.

While displaying the message indicating the standby mode as above-mentioned, the apparatus controlling firmware 1013 confirms the resource necessity status and the resource real status, and further confirms whether or not the resource real status fulfills the resource necessity status, and whether or not the current status is such a state that the default display screen of the calling destination can be displayed (Step S1105, shown in FIG. 8).

Figure 11:
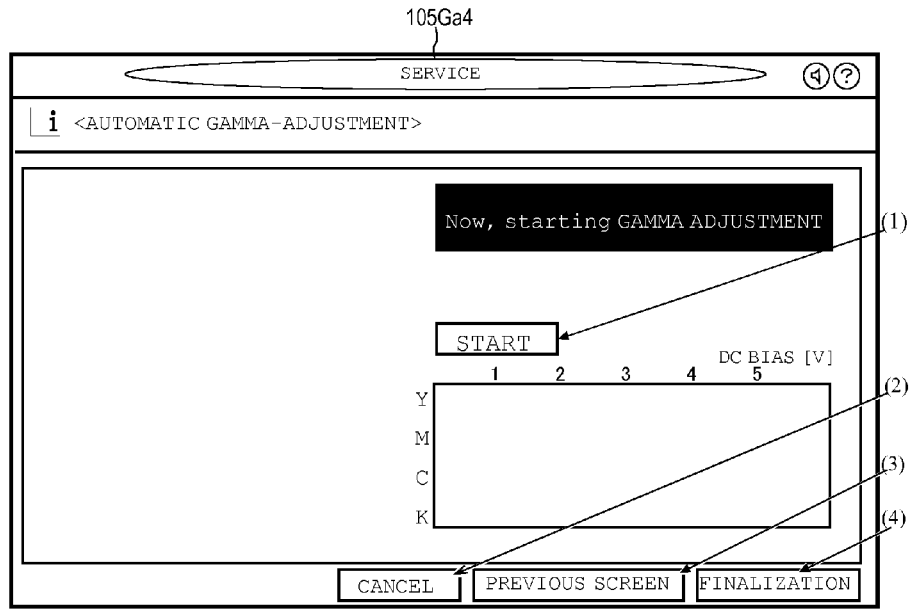
FIG. 11 is an explanatory schematic diagram showing still another display screen to be displayed during an operation of an image forming apparatus in accordance with an embodiment of the present invention.

When determining that the "resource real status" fulfills the "resource necessity status" and the default display screen of the calling destination can be displayed (Step S1105; YES, shown in FIG. 8), the apparatus controlling firmware 1013 releases the ban of the operation for accepting the user's inputting operation (Step S1106, shown in FIG. 8), and calls out the default display screen (shown in FIG. 11), designated by the calling out instruction, to display the concerned default display screen onto the operation display section 105, and implements the adjustment item of the function corresponding to the default display screen concerned (Step S1107, shown in FIG. 8). FIG. 11 shows an example of an automatic gamma-adjustment default display screen 105Ga4, which is to be managed by the apparatus controlling firmware 1013.

Figure 12:
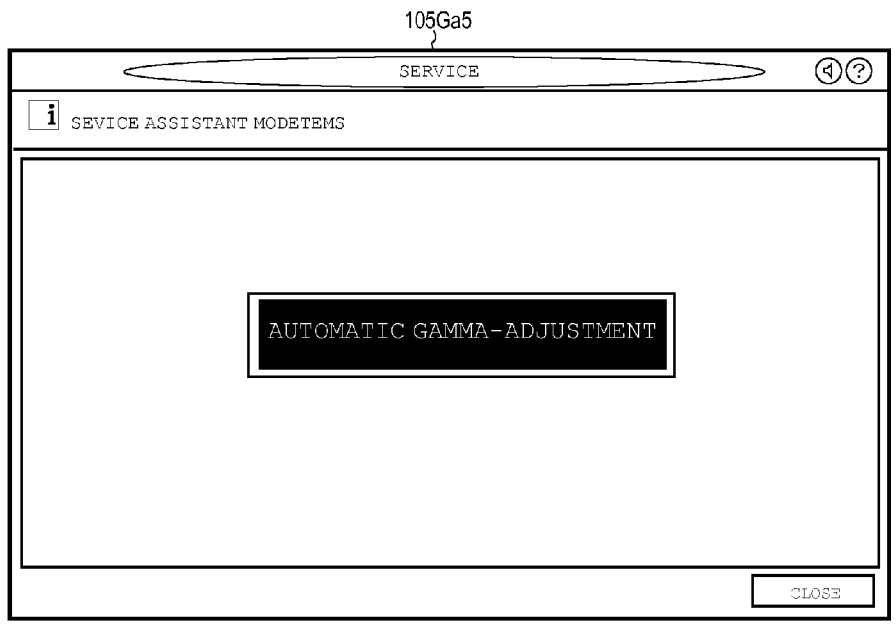
FIG. 12 is an explanatory schematic diagram showing yet another display screen to be displayed during an operation of an image forming apparatus in accordance with an embodiment of the present invention.

In this connection, it is also applicable that, at the time when the "resource real status" fulfills the "resource necessity status" after the mode change operation has been completed (Step S1105; YES, shown in FIG. 8), the apparatus controlling firmware 1013 conducts controlling operations for displaying a preparation completion display screen 105Ga5, indicating that the preparation for making it possible to display the default display screen (shown in FIG. 11), designated by the calling out instruction, has been completed, onto the operation display section 105. Further, at the time when the user depresses the automatic gamma-adjustment button disposed at the center of the preparation completion display screen 105Ga5 shown in FIG. 12, the apparatus controlling firmware 1013 conducts controlling operations for displaying the automatic gamma-adjustment default display screen 105Ga4, shown in FIG. 11, on the operation display section 105.

Successively, based on the automatic gamma-adjustment default display screen 105Ga4 (shown in FIG. 11) called out by the service assistant tool screen 105Ga2 (indicated by arrow (2), shown in FIG. 7) serving as the customizable display screen, the apparatus controlling firmware 1013 implements the automatic gamma-adjustment in response to the user's operation for depressing the start button (indicated by arrow (1), shown in FIG. 11) (Step S111, shown in FIG. 5).

As described in the foregoing, the apparatus controlling firmware 1013 compares the "resource real status" and the "resource necessity status" with each other so as to output the default display screen onto the display section at the time after the "resource real status" and the "resource necessity status" have coincided with each other. According to the above-mentioned feature, the linked controlling operation for calling out the default display screen is implemented between the apparatus controlling firmware 1013 and the Web display screen application program 1014. In other words, since it is possible for the customizable display screen side to call out the default display screen in an appropriate state in which the "resource real status" fulfills the "resource necessity status", it becomes possible to control various kinds of functions provided in the image forming apparatus in a stable and appropriate state of the apparatus concerned.

Still successively, in a case where the user depresses the "CANCEL" button (indicated by arrow (2), shown in FIG. 11) provided within the automatic gamma-adjustment default display screen 105Ga4, currently called out, so as to cancel the automatic gamma-adjustment, or in a case where the user depresses the "PREVIOUS SCREEN" button (indicated by arrow (3), shown in FIG. 11) so as to input instruction for returning to the previous screen, irrespective of whether or not the automatic gamma-adjustment based on the automatic gamma-adjustment default display screen 105Ga4, currently called out, has been completed, or in a case where the user depresses the "FINALIZATION" button (indicated by arrow (4), shown in FIG. 11) after the automatic gamma-adjustment based on the automatic gamma-adjustment default display screen 105Ga4, currently called out, has been completed, namely, in a case where the user inputs an instruction for closing (finalizing) the automatic gamma-adjustment default display screen 105Ga4, currently called out, (Step S112: YES, shown in FIG. 5), the apparatus controlling firmware 1013 finalizes the default display screen, currently called out, and implements processing for returning to the previous screen (Step S113, shown in FIG. 5).

Next, referring to the flowchart shown in FIG. 13, the finalization processing of the default display screen (Step S113, shown in FIG. 5) will be detailed in the following. When implementing the screen calling operation to open the default display screen as aforementioned, the apparatus controlling firmware 1013 holds (stores) in advance information, representing whether the caller thereof is the apparatus controlling firmware 1013 or the Web display screen application program 1014, therein.

Figure 13:
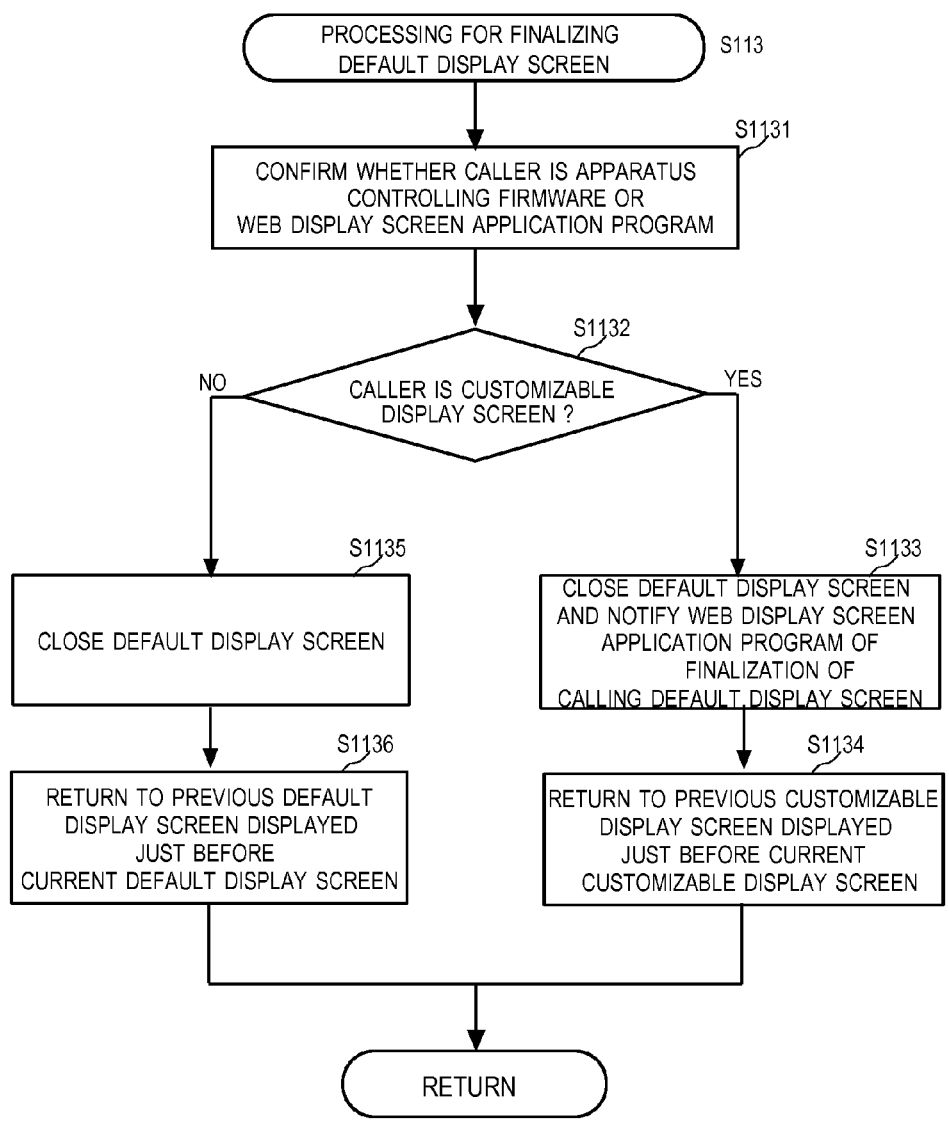
FIG. 13 is a flowchart indicating a flow of operations to be implemented in an image forming apparatus in accordance with an embodiment of the present invention.

Successively, at the time when implementing the processing for finalizing the calling out operation of the default display screen (Step S113, shown in FIG. 5), the apparatus controlling firmware 1013 confirms whether the caller concerned has been the apparatus controlling firmware 1013 or the Web display screen application program 1014 (Step S1131, shown in FIG. 13).

When determining that the caller of the default display screen to be finalized is the customizable display screen (Step S1132; YES, shown in FIG. 13), the apparatus controlling firmware 1013 notifies the Web display screen application program 1014 of the finalization of the default display screen currently called out (Step S1133, shown in FIG. 13). Further, the apparatus controlling firmware 1013 conducts controlling operations for closing the default display screen currently called out.

Still successively, receiving the notification representing the finalization of the default display screen currently called out, the Web display screen application program 1014 conducts controlling operations for displaying the customizable display screen, which was displayed just before the default display screen currently called out has been displayed, (for instance, the service assistant tool screen 105Ga2 shown in FIG. 7), onto the operation display section 105 (Step S1134, shown in FIG. 13). As a result of the above-mentioned operation, the Web display screen application program 1014 returns to Step S114, and then, returns to Step S109 shown in FIG. 5, in which the control section 101 confirms whether or not an instruction for calling out the default display screen exists (Step S114; customizable display screen, shown in FIG. 5).

When determining that the caller of the default display screen to be finalized is the other default display screen, instead of the customizable display screen, (Step S1132; NO, shown in FIG. 13), the apparatus controlling firmware 1013 conducts controlling operations for closing the default display screen currently called out (Step S1135, shown in FIG. 13). Then, the apparatus controlling firmware 1013 conducts controlling operations for displaying the previous default display screen, which was displayed just before the default display screen currently called out has been displayed, onto the operation display section 105 (Step S1136, shown in FIG. 13). As a result of the above-mentioned operation, the apparatus controlling firmware 1013 returns to Step S114, and then, returns to Steps S102 and S103 shown in FIG. 5, in which the control section 101 accepts the user's inputting operations through the operation display section 105 (Step S114; default display screen, shown in FIG. 5).

As described in the foregoing, when finalizing the operation for outputting the default display screen designated by the screen calling out instruction issued from the Web display screen application program 1014, the apparatus controlling firmware 1013 notify the Web display screen application program 1014 of the finalization concerned. Receiving the finalization notification concerned, the Web display screen application program 1014 displays the previous customizable display screen, stored in advance, onto the operation display section 105, wherein the Web display screen application program 1014 has stored the previous customizable display screen, which was displayed at the time when implementing the screen calling operation. As the result of the above-mentioned operation, it becomes possible to call out the default display screen from the customizable display screen, and then, to return to the original (previous) customizable display screen again. In other words, since the bilateral linkage controlling operations can be implemented between the default display screen and the customizable display screen, it becomes possible to easily control various kinds of functions provided in an image forming apparatus.

Other Embodiment 1

According to the embodiment described in the foregoing, each of the apparatus controlling firmware 1013 and the Web display screen application program 1014 is independently operated in the separate process. However, the scope of the present invention is not limited to the above-mentioned. For instance, it is also applicable that another control functional section for operating the Web display screen as a separate task, which is independent from the control functional section for operating the default display screen, is incorporated within the apparatus controlling firmware 1013, so as to make the other control functional section for operating the Web display screen depict the customizable display screen, based on the description written in the Markup language, such as HMTL, etc.

Other Embodiment 2

According to the embodiment described in the foregoing, the adjusting operations or the like, including an operation for acquiring statuses of various kinds of sections provided in the image forming apparatus 100, an operation for attaching an instruction, etc., are conducted from the default display screen managed by the apparatus controlling firmware 1013. In addition, various kinds of displaying operations, and the controlling operations for calling out the default display screen when the adjusting operations are required, are conducted from the customizable display screen. However, the scope of the present invention is not limited to the above-mentioned.

For instance, not only the various kinds of displaying operations and the controlling operations for calling out the default display screen, but also the adjusting operations or the like, including the operation for acquiring statuses of various kinds of sections provided in the image forming apparatus 100, the operation for attaching an instruction, etc., may be conducted from the customizable display screen, as well as from the default display screen managed by the apparatus controlling firmware 1013.

Now, let us assume various kinds of cases in which various kinds of controlling operations are respectively performed, such as in a case where an operation for attaching a simple operating instruction is performed without performing an operation for acquiring statuses of various kinds of sections, in a case where operations for attaching a simple operating instruction and receiving a result of success or failure thereof are performed without performing an operation for acquiring statuses of various kinds of sections, in a case where operations for acquiring a simple status, such as pro or con (acceptable or inacceptable), etc., and attaching an operating instruction with respect to a simple action are performed without acquiring detected values of various sections, etc. In any one of such the cases as above-mentioned, not only the default display screen managed by the apparatus controlling firmware 1013, but also the customizable display screen managed by the Web display screen application program 1014, may be employed for conducting the controlling operations.

On the other hand, instead of an operation for acquiring a simple status, such as acquiring a result of pro or con (acceptable or inacceptable), etc., with respect to each of the sections, let us assume various kinds of other cases in which various kinds of other controlling operations are respectively performed, such as in a case where detected values of a voltage, an electric current, etc., are acquired, in a case where attaching an operating instruction associating with a plurality of conditional designations, instead of a simple instruction, in a case where operations for acquiring statuses of various sections are required associating with attaching an operating instruction, in a case where operations for acquiring a status and attaching an operating instruction are repeatedly implemented corresponding to each of operating status, etc. In any one of such the cases as above-mentioned, it is desirable that not only the customizable display screen managed by the Web display screen application program 1014, but also the default display screen managed by the apparatus controlling firmware 1013, should be employed for conducting the controlling operations.

As described in the foregoing, by using both the default display screen and the customizable display screen as needed on the situation demands so as to appropriately conduct controlling operations of the apparatus concerned, it becomes possible to conduct a huge variety of controlling operations of the apparatus concerned, corresponding to each of various kinds of situations.

Other Embodiment 3

In the foregoing, it has been assumed that the default display screen and the customizable display screen are displayed onto the display screen provided in the operation display section 105. However, the scope of the present invention is not limited to the above-mentioned assumption. For instance, it is possible to transmit screen data of the default display screen and other screen data of the customizable display screen to another display section provided in a certain external device so as to make the other display section serve as a remote panel displaying the screens concerned. In this connection, in case of the fault recovery procedure, it is desirable that the concerned screens can be displayed onto the tablet-type computer owned by the user.

Other Embodiment 4

In the foregoing, such a case that the operation for controlling the hardware resource in each of the sections provided in the image forming apparatus 100 is conducted by using the default display screen and the customizable display screen, has been exemplified as an embodiment of the present invention. However, the scope of the present invention is not limited to the above-mentioned embodiment. For instance, it is desirable that an operation for controlling a hardware resource in each of the first-third post processing apparatuses 200-400 is conducted in the same manner as above-mentioned.

<Effects to be Obtained from Preferred Embodiment>

(1) The Web display screen application program designates any one of default display screens to be controlled by the apparatus controlling firmware, and calls out the designated default display screen. Then, at the time when the Web display screen application program instructs the apparatus controlling firmware to conduct the screen calling operation in a state that the Web display screen application program displays the customizable display screen onto the display section, the apparatus controlling firmware outputs the designated default display screen onto the display section.

According to the above-mentioned feature, in the screen calling operation to be conducted by the apparatus controlling firmware based on the instruction issued by the Web display screen application program, the linked controlling operation for calling out the default display screen is implemented between the default display screen managed by the apparatus controlling firmware and the customizable display screen of the separate process. Accordingly, in a case where both the default display screen and the customizable display screen can be displayed, it becomes possible to easily control various kinds of functions provided in the image forming apparatus.

(2) In the image forming apparatus recited in item 1, the Web display screen application program is provided with a Web-browser that displays a description written in a Markup language as the customizable display screen. According to the above-mentioned feature, by calling out the default display screen from the customizable display screen side customized in an arbitral form, it becomes possible to easily control various kinds of functions provided in the image forming apparatus.

(3) In the image forming apparatus recited in item 1 or 2, based on a screen number to be employed for managing the default display screen by the apparatus controlling firmware, the control section conducts the screen calling operation. According to the above-mentioned feature, in the screen calling operation to be conducted by the apparatus controlling firmware based on the instruction issued by the Web display screen application program, since the linked controlling operation for calling out the default display screen is securely implemented between the default display screen and the customizable display screen, it becomes possible to easily control various kinds of functions provided in the image forming apparatus from the customizable display screen side.

(4) In the image forming apparatus recited in any one of items 1-3, the apparatus controlling firmware compares the resource necessity status in regard to the hardware resource with the resource real status, so that, after determining that the resource necessity status and the resource real status coincide with each other, the apparatus controlling firmware outputs the default display screen onto the display section. According to the above-mentioned feature, in the screen calling operation to be conducted by the apparatus controlling firmware based on the instruction issued by the Web display screen application program, since the linked controlling operation for calling out the default display screen is securely implemented between the default display screen and the customizable display screen, it becomes possible to easily control various kinds of functions provided in the image forming apparatus from the customizable display screen side.

(5) In the image forming apparatus recited in any one of items 1-4, the Web display screen application program has stored in advance the customizable display screen, which was displayed at the time when the screen calling operation was implemented, therein. On the other hand, when finalizing an operation for outputting the designated default display screen, which has been designated by the screen calling operation from the Web display screen application program, the apparatus controlling firmware notifies the Web display screen application program of a notification indicating that the operation for outputting the designated default display screen has been finalized. Receiving the notification, the Web display screen application program outputs the customizable display screen, stored in advance, onto the display section. According to the above-mentioned feature, by calling out the default display screen from the customizable display screen side, it becomes possible to return to the previous customizable display screen again. In other words, since the bilateral and linked controlling operations are implemented between the default display screen and the customizable display screen, it becomes possible to easily control various kinds of functions.

(6) In the image forming apparatus recited in any one of items 1-5, the operations for controlling the concerned apparatus are conducted, not only through the default display screen, but also through the customizable display screen. According to the above-mentioned feature, it becomes possible to control the concerned apparatus, not only from the default display screen, but also from the customizable display screen side.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus, comprising:
    a storage section; and
    a control section that employs a hardware resource to conduct a controlling operation in regard to an image forming operation;
    wherein the control section is capable of executing an apparatus controlling firmware that controls a default display screen, which is provided for a status display and an instruction accepting use display in regard to the image forming operation, both to be displayed on a display section, according to a first process, and a Web display screen application program that controls a customizable display screen, which can be arbitrarily customized and is provided for the status display and the instruction accepting use display, both to be displayed on the display section, according to a second process being separate from the first process for the apparatus controlling firmware; and
    wherein, based on the Web display screen application program, the control section designates any one of default display screens to be controlled by the apparatus controlling firmware, so as to conduct a screen calling operation for calling out the any one of the default display screens as a designated default display screen; and
    wherein, when the Web display screen application program instructs the apparatus controlling firmware to conduct the screen calling operation in a state that the Web display screen application program displays the customizable display screen onto the display section, the control section outputs the designated default display screen onto the display section, based on the apparatus controlling firmware.

2. The image forming apparatus of claim 1,
    wherein the Web display screen application program is provided with a Web-browser that displays a description written in a Markup language as the customizable display screen.

3. The image forming apparatus of claim 1,
    wherein, based on a screen number to be employed for managing the default display screen by the apparatus controlling firmware, the control section conducts the screen calling operation.

4. The image forming apparatus of claim 1,
    wherein the storage section stores in advance information in regard to a resource necessity status, which serves as a necessary status of the hardware resource to be required for displaying the default display screen, for every display screen, therein; and
    wherein, based on the apparatus controlling firmware, the control section compares the resource necessity status with a resource real status, which serves as a real status of the hardware resource currently existing in the image forming apparatus; and
    wherein, when determining that the resource necessity status and the resource real status do not coincide with each other, the control section does not output the default display screen onto the display section, while, when determining that the resource necessity status and the resource real status coincide with each other, the control section outputs the default display screen onto the display section.

5. The image forming apparatus of claim 1,
    wherein, when finalizing an operation for outputting the designated default display screen, which has been designated by the screen calling operation from the Web display screen application program, the control section notifies the Web display screen application program of a notification indicating that the operation for outputting the designated default display screen has been finalized; and
    wherein, based on the Web display screen application program, the control section has stored the customizable display screen, which was displayed at the time when the screen calling operation was implemented, therein, and when receiving the notification, the control section outputs the customizable display screen onto the display section.

6. The image forming apparatus of claim 1,
    wherein a controlling operation for controlling any one of sectional sites, residing within the image forming apparatus, is conducted through the default display screen based on the apparatus controlling firmware, while, another controlling operation for controlling any one of the sectional sites, residing within the image forming apparatus, is conducted through the customizable display screen.

7. An image forming system, comprising:
    a storage section;
    a display section; and
    a control section that employs a hardware resource to conduct a controlling operation in regard to an image forming operation;
    wherein the control section is capable of executing an apparatus controlling firmware that controls a default display screen, which is provided for a status display and an instruction accepting use display in regard to the image forming operation, both of to be displayed on the display section, according to a first process, and a Web display screen application program that controls a customizable display screen, which can be arbitrarily customized and is provided for the status display and the instruction accepting use display, both to be displayed on the display section, according to a second process being separate from the first process for the apparatus controlling firmware; and
    wherein the display section displays the default display screen or the customizable display screen; and
    wherein, based on the Web display screen application program, the control section designates any one of default display screens to be controlled by the apparatus controlling firmware, so as to conduct a screen calling operation for calling out the any one of the default display screens as a designated default display screen; and
    wherein, when the Web display screen application program instructs the apparatus controlling firmware to conduct the screen calling operation in a state that the Web display screen application program displays the customizable display screen onto the display section, the control section outputs the designated default display screen onto the display section, based on the apparatus controlling firmware.

8. The image forming system of claim 7,
    wherein the Web display screen application program is provided with a Web-browser that displays a description written in a Markup language as the customizable display screen on the display section.

9. The image forming system of claim 7,
wherein, based on a screen number to be employed for managing the default display screen by the apparatus controlling firmware, the control section conducts the screen calling operation.

10. The image forming system of claim 7,
wherein the storage section stores in advance information in regard to a resource necessity status, which serves as a necessary status of the hardware resource to be required for displaying the default display screen, for every display screen, therein; and
wherein, based on the apparatus controlling firmware, the control section compares the resource necessity status with a resource real status, which serves as a real status of the hardware resource currently existing in the image forming apparatus; and
wherein, when determining that the resource necessity status and the resource real status do not coincide with each other, the control section does not output the default display screen onto the display section, while, when determining that the resource necessity status and the resource real status coincide with each other, the control section outputs the default display screen onto the display section.

11. The image forming system of claim 7,
wherein, when finalizing an operation for outputting the designated default display screen, which has been designated by the screen calling operation from the Web display screen application program, the control section notifies the Web display screen application program of a notification indicating that the operation for outputting the designated default display screen has been finalized; and
wherein, based on the Web display screen application program, the control section has stored the customizable display screen, which was displayed at the time when the screen calling operation was implemented, therein, and when receiving the notification, the control section outputs the customizable display screen onto the display section.

12. The image forming system of claim 7,
wherein a controlling operation for controlling any one of sectional sites, residing within an apparatus concerned, is conducted through the default display screen based on the apparatus controlling firmware and displayed on the display section, while, another controlling operation for controlling any one of the sectional sites, residing within the apparatus concerned, is conducted through the customizable display screen.

13. A method for controlling an image forming operation to be conducted in an image forming system that includes a storage section, a display section, and a control section that employs a hardware resource to conduct a controlling operation in regard to the image forming operation, the method comprising the steps of:
making the control section execute an apparatus controlling firmware that controls a default display screen, which is provided for a status display and an instruction accepting use display in regard to the image forming operation, both to be displayed on the display section, according to a first process;
making the control section execute a Web display screen application program that controls a customizable display screen, which can be arbitrarily customized and is provided for the status display and the instruction accepting use display, both to be displayed on the display section, according to a second process being separate from the first process for the apparatus controlling firmware;
making the display section displays the default display screen or the customizable display screen thereon;
wherein, based on the Web display screen application program, the control section designates any one of default display screens to be controlled by the apparatus controlling firmware, so as to conduct a screen calling operation for calling out the any one of the default display screens as a designated default display screen; mad
wherein, when the Web display screen application program instructs the apparatus controlling firmware to conduct the screen calling operation in a state that the Web display screen application program displays the customizable display screen onto the display section, the control section outputs the designated default display screen onto the display section, based on the apparatus controlling firmware.

14. The method of claim 13,
wherein the Web display screen application program is provided with a Web-browser that displays a description written in a Markup language as the customizable display screen on the display section.

15. The method of claim 13,
wherein, based on a screen number to be employed for managing the default display screen by the apparatus controlling firmware, the control section conducts the screen calling operation.

16. The method of claim 13,
wherein the storage section stores in advance information in regard to a resource necessity status, which serves as a necessary status of the hardware resource to be required for displaying the default display screen, for every display screen, therein; and
wherein, based on the apparatus controlling firmware, the control section compares the resource necessity status with a resource real status, which serves as a real status of the hardware resource currently existing in the image forming apparatus; and
wherein, when determining that the resource necessity status and the resource real status do not coincide with each other, the control section does not output the default display screen onto the display section, while, when determining that the resource necessity status and the resource real status coincide with each other, the control section outputs the default display screen onto the display section.

17. The method of claim 13,
wherein, when finalizing an operation for outputting the designated default display screen, which has been designated by the screen calling operation from the Web display screen application program, the control section notifies the Web display screen application program of a notification indicating that the operation for outputting the designated default display screen has been finalized; and
wherein, based on the Web display screen application program, the control section has stored the customizable display screen, which was displayed at the time when the screen calling operation was implemented, therein, and when receiving the notification, the control section outputs the customizable display screen onto the display section.

18. The method of claim 13,
wherein a controlling operation for controlling any one of sectional sites, residing within an apparatus concerned, is conducted through the default display screen based on the apparatus controlling firmware and displayed on the display section, while, another controlling operation for controlling any one of the sectional sites, residing within the apparatus concerned, is conducted through the customizable display screen.

\* \* \* \* \*